(12) United States Patent
Winheim et al.

(10) Patent No.: US 9,590,323 B2
(45) Date of Patent: Mar. 7, 2017

(54) ELECTRIC MOTOR, IN PARTICULAR A RADIATOR FAN MOTOR, AND A CONTACT

(71) Applicant: BROSE FAHRZEUGTEILE GMBH & CO. KOMMANDITGESELLSCHAFT, WUERZBURG, Wuerzberg (DE)

(72) Inventors: Georg Winheim, Gemuenden am Main (DE); Thomas Ziegler, Schwebenried (DE); Stefan Zick, Wuerzburg (DE); Jan Gwozdz, Wuerzburg (DE); Maik Ruemmler, Baunach (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 394 days.

(21) Appl. No.: 14/206,307

(22) Filed: Mar. 12, 2014

(65) Prior Publication Data

US 2014/0191598 A1    Jul. 10, 2014

Related U.S. Application Data

(63) Continuation of application No. PCT/EP2012/003576, filed on Aug. 24, 2012.

(30) Foreign Application Priority Data

Sep. 12, 2011   (DE) .................. 10 2011 112 821

(51) Int. Cl.
*H01R 4/24*      (2006.01)
*H02K 11/00*     (2016.01)
*H02K 5/22*      (2006.01)

(52) U.S. Cl.
CPC .......... *H01R 4/242* (2013.01); *H01R 4/2425* (2013.01); *H02K 11/00* (2013.01); *H02K 11/33* (2016.01);
(Continued)

(58) Field of Classification Search
USPC ............... 439/404, 816, 401; 310/68 R, 401; 361/782
See application file for complete search history.

(56) References Cited

U.S. PATENT DOCUMENTS 4,116,522 A * 9/1978 Reynolds ............. H01R 4/2462
439/398
4,317,608 A * 3/1982 Dechelette ........... H01R 4/2462
439/403
(Continued)

FOREIGN PATENT DOCUMENTS

CN        1195909 A    10/1998
DE        3214896 C1   10/1983
(Continued)

*Primary Examiner* — Alexander Gilman
(74) *Attorney, Agent, or Firm* — Laurence A. Greenberg; Werner H. Stemer; Ralph E. Locher

(57) ABSTRACT

An electric motor, in particular a radiator fan motor of a motor vehicle, has a stator which is fitted with a rotating-field winding, and a rotor which is mounted such that it can rotate in relation to the stator. A converter electronics system is provided, wherein a number of contact elements for insulation-free or enamel-insulated connection contacts of at least one component of the converter electronics system and/or for enamel-insulated winding ends of the rotating-field winding are mounted on a printed circuit board. The contact elements are in the form of clamping contacts or insulation-displacement terminal contacts.

7 Claims, 11 Drawing Sheets

(52) U.S. Cl.
CPC .......... *H02K 5/225* (2013.01); *H02K 2211/03* (2013.01)

(56) References Cited

U.S. PATENT DOCUMENTS

| | | | | |
|---|---|---|---|---|
| 4,580,870 | A * | 4/1986 | Gerke | H01R 4/2425 439/816 |
| 5,783,872 | A * | 7/1998 | Blair | B60L 11/1809 307/46 |
| 5,997,336 | A * | 12/1999 | Yamamoto | H01R 4/2425 439/397 |
| 6,297,572 | B1 * | 10/2001 | Sunaga | H02K 11/33 310/64 |
| 6,688,904 | B1 * | 2/2004 | Schnalzger | B60T 8/3675 303/119.3 |
| 7,563,143 | B2 * | 7/2009 | Okabe | H01R 33/06 439/221 |
| 8,436,711 | B2 * | 5/2013 | Rohl | H01F 27/2847 313/153 |
| 8,911,250 | B2 * | 12/2014 | Ehlen | H01R 13/6315 439/248 |
| 9,006,961 | B2 * | 4/2015 | Helmi | H02K 3/50 310/401 |
| 2004/0027014 | A1 * | 2/2004 | Weigold | H02K 5/225 310/68 R |
| 2014/0321090 | A1 * | 10/2014 | Guerin | H02M 7/003 361/782 |

FOREIGN PATENT DOCUMENTS

| | | |
|---|---|---|
| DE | 19736119 A1 | 3/1999 |
| DE | 10159760 A1 | 6/2002 |
| DE | 102008033905 A1 | 1/2010 |
| EP | 1079502 A1 | 2/2001 |
| EP | 1289341 A2 | 3/2003 |
| FR | 2750542 A1 | 1/1998 |
| FR | 2818489 A3 | 6/2002 |
| JP | S6464285 A | 3/1989 |
| JP | H02302087 A | 12/1990 |
| JP | H10228932 A | 8/1998 |
| JP | 3690197 B2 | 8/2005 |
| KR | 1020030019378 A | 6/2003 |
| WO | 02087057 A1 | 10/2002 |

* cited by examiner

ELECTRIC MOTOR, IN PARTICULAR A RADIATOR FAN MOTOR, AND A CONTACT

CROSS-REFERENCE TO RELATED APPLICATION

This is a continuation application, under 35 U.S.C. §120, of copending international application No. PCT/EP2012/003576, filed Aug. 24, 2012, which designated the United States; this application also claims the priority, under 35 U.S.C. §119, of German patent application No. DE 10 2011 112 821.6, filed Sep. 12, 2011; the prior applications are herewith incorporated by reference in their entirety.

BACKGROUND OF THE INVENTION

Field of the Invention

The invention relates to an electric motor, in particular a brushless electric motor having an internal rotor, preferably a radiator fan motor of a motor vehicle.

An electric motor of this kind usually contains a rotor which is mounted such that it can rotate in relation to a stationary stator. In a brushless electric motor, the stator is often fitted with a rotating-field winding with which a magnetic rotating field is generated on account of an alternating current being applied to the rotating-field winding. The rotor which is arranged within the substantially hollow-cylindrical stator is generally fitted with permanent magnets which generate a rotor magnetic field which interacts with the rotating field of the stator.

In a brushless electric motor, the alternating current which is provided for feeding the stator or rotating-field winding is usually generated by a converter (inverter). The inverter which is usual in this respect converts a DC voltage, in particular the on-board electrical system voltage of the motor vehicle, into an AC voltage for feeding the rotating-field winding. In relatively small electric motors, the converter is often accommodated, together with an associated control electronics system, in an electronics compartment which is integrated into the motor housing.

The control electronics system usually contains an interference-suppression inductor (EMC protection), possibly an interference-suppression capacitor and also a DC-side energy store in the form of one or more storage or charging capacitors (electrolytic capacitors). The interference-suppression inductor and the or each charging capacitor and also further, in particular active, structural elements in the form of power semiconductors, which are interconnected to form a bridge circuit and are connected to the rotating-field winding, are generally mounted on a printed circuit board and connected to one another to form a circuit on the printed circuit board. Contact is usually made with the structural elements by solder connections.

SUMMARY OF THE INVENTION

The invention is therefore based on the object of providing an electric motor, it being possible to make contact with the electronics system of the electric motor, in particular with the structural elements or connection components of the electronics system, in a reliable manner with the lowest possible level of complexity.

To this end, the electric motor, which is used in particular as a radiator fan motor of a motor vehicle, contains a stator which is wound with a rotating-field winding, and a rotor which is mounted such that it can rotate in relation to the stator. A converter electronics system for converting a DC voltage is provided, in particular the on-board electrical system voltage of the motor vehicle, into an AC voltage for feeding the rotating-field winding. The winding is produced, in particular, in the form of several coils or coil windings which are preferably connected or interconnected to one another to form a delta connection. The rotor preferably has permanent-magnet excitation and, to this end, is fitted with magnets.

A number of contact elements for insulation-free connection contacts of at least one structural element of the converter electronics system, in particular of the or each charging capacitor, and also for enamel-insulated contact elements or connection contacts, in particular for winding ends of the rotating-field winding and/or for contact or coil ends of the interference-suppression inductor, are mounted on a printed circuit board of the converter electronics system. The contact elements are in the form of clamping contacts, in particular for the or each charging capacitor, or in the form of insulation-displacement contacts for the enamel-insulated winding or contact ends.

Contact is advantageously made with the charging capacitors by a pair of busbars or one or two busbars or power busbars. The pair of busbars has a number of clamping contacts which corresponds to the number of connection contacts. In order to mount and/or hold the pair of busbars on the printed circuit board, the printed circuit board has a number of insertion slots or insertion holes into which the pair of busbars are inserted by way of corresponding insertion points. At least one insertion point, which corresponds to one of the insertion holes, of at least one busbar of the pair of busbars is suitably in the form of a press-in pin in this case. The design of the or each press-in pin as a wedge-shaped or arrowhead-shaped armature part allows the or each busbar on the printed circuit board to be reliably fastened in the corresponding insertion openings or holes.

For a space-saving arrangement and reliable contact-connection of, in particular, a plurality of charging or storage capacitors which are to be connected in parallel, a number of recesses, which corresponds to the number of storage capacitors, are made in one of the two busbars of the pair of busbars which are preferably parallel to one another. The respective connection contact, with which contact is made in a clamping manner by the other busbar, of the corresponding charging capacitor is guided without contact, and therefore in a contact-free manner, by the recesses.

In order to suppress creepage currents and to prevent temperature-related crystallization phenomena, a number of recesses are made in the printed circuit board between the insertion slots or insertion holes which are associated with the two busbars of the pair of busbars. The recesses are preferably configured in the manner of slots and run parallel to the busbars.

In a particularly advantageous refinement of the or each insulation-displacement contact, the insulation-displacement contact has, between its two insulation-displacement limbs, an insulation-displacement gap which extends in the insulation-displacement direction from an insertion opening to the contact base and has a pre-cutting zone which adjoins the insertion opening. The pre-cutting zone is suitably sharp-edged and reliably cuts into the enamel insulation of the enamel-insulated connection contact of the interference-suppression inductor or of the winding ends of the rotating-field winding in the respective cutting limb of the insulation-displacement contact.

According to an expedient development of this refinement of the insulation-displacement contact, an abrasion zone for the enamel insulation of the connection contact adjoins the pre-cutting zone of the insulation-displacement gap in the insulation-displacement direction. The abrasion zone is preferably configured to run in an oblique manner along the insulation-displacement gap in the insulation-displacement direction that is to say in the shape of a wedge or in the shape of a V in the direction of the contact or clamping base of the insulation-displacement gap.

In order to slowly increase the clamping force in the insulation-displacement direction, the insulation-displacement gap has a clamping zone which is particularly preferably of rounded design, that is to say has a radius. The clamping zone expediently adjoins the abrasion zone.

The insulation-displacement contact constitutes an independent invention. It is particularly suitable for enamel-insulated solid wires. In comparison to conventional insulation-displacement contacts, the insulation-displacement contact contains a pre-cutting zone which adjoins an insertion opening or introduction zone and is located in the insulation-displacement gap between the insulation-displacement limbs in the insulation-displacement direction upstream of the clamping or contact base.

In an advantageous refinement of the insulation-displacement contact, the insulation-displacement contact contains a preferably obliquely running abrasion zone, which adjoins the pre-cutting zone in the insulation-displacement direction, in the insulation-displacement gap for an enamel-insulated connection contact or solid wire. In addition or as an alternative, a preferably rounded clamping zone is provided, which expediently adjoins the abrasion zone in the insulation-displacement direction. The correspondingly configured abrasion zone slowly increases the clamping force within the insulation-displacement gap. As a result, the (maximum) press-in forces are reduced, this in turn resulting in the fastening point (solder point) of the insulation-displacement contact on a printed circuit board or the like being relieved of stress.

Other features which are considered as characteristic for the invention are set forth in the appended claims.

Although the invention is illustrated and described herein as embodied in a electric motor, in particular a radiator fan motor, and a contact, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings (examples).

DETAILED DESCRIPTION OF THE INVENTION

Figure 1:
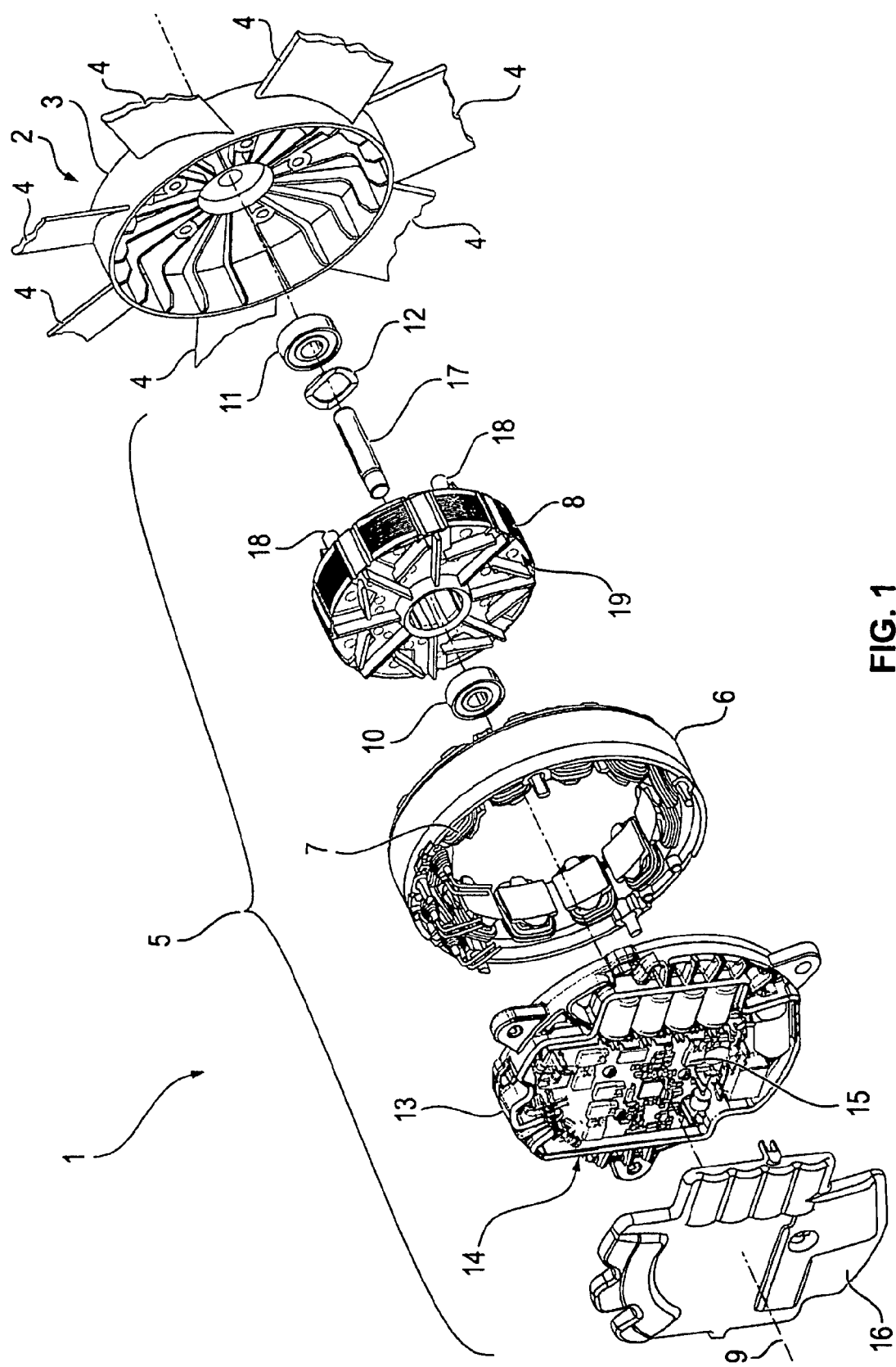
FIG. 1 is an exploded, perspective view of a radiator fan for a motor vehicle, having a self-cooled, brushless internal rotor motor with an integrated converter electronics system according to the invention.

Mutually corresponding parts and magnitudes are always provided with the same reference symbols in all of the figures. Referring now to the figures of the drawings in detail and first, particularly to FIG. 1 thereof, there is shown, in an exploded state, a fan 1 for a radiator of a motor vehicle. The fan 1 contains a fan impeller 2 having a central cap 3, air guide vanes 4 (which are illustrated only in a rudimentary manner) being arranged in a uniformly distributed manner around an outer circumference of the central cap 3. The fan 1 further has an electric motor 5 which is also called a fan motor and by which the fan impeller 2 can be driven in rotation.

The motor 5 is substantially formed by a stator 6 which is wound with a three-phase rotating-field winding 7 in the form of coils. The motor 5 further has a permanent-magnet rotor 8 which is mounted, such that it can rotate about a motor axis 9, in the interior of the stator 6. In order to mount the rotor 8, the motor 5 has two roller bearings 10 and 11 which engage on the rotor 8 from axially opposite sides. The axial play of the rotor 8 between the two roller bearings 10 and 11 is sprung by a spring ring 12 in this case.

The motor 5 further has an approximately disk-like motor support 13. An electronics compartment 14, into which a converter electronics system 15 is inserted, is made in the motor support 13 at an end which is averted from the fan impeller 2. In order to close the electronics compartment 14 in a sealed manner, the motor 5 has an electronics compartment cover 16, which is also called a housing cover in the text which follows.

The rotor 8 is formed (in a manner which is not illustrated in any detail) by a laminated core into which permanent magnets are inserted for the purpose of generating an excitation field, wherein the laminated core, together with the inserted permanent magnets, is encapsulated by a plastic casing. Similarly, the stator 6 also has a laminated core which is encapsulated by a plastic casing.

The motor support 13 is formed, in particular, by an integral aluminum diecast part. The electronics compartment cover 16 is preferably a plastic injection-molded part.

The front of the rotor 8 is provided with four screw bosses 18 by which the rotor 8 is screwed to the fan impeller 2 in the mounted state. The motor 5 and therefore the entire fan 1 are fastened to the vehicle by the motor support 13 which, for this purpose, is provided with three screw lugs 19 which project from its outer circumference. The motor 5 is a brushless self-cooled internal rotor motor.

Figure 2:
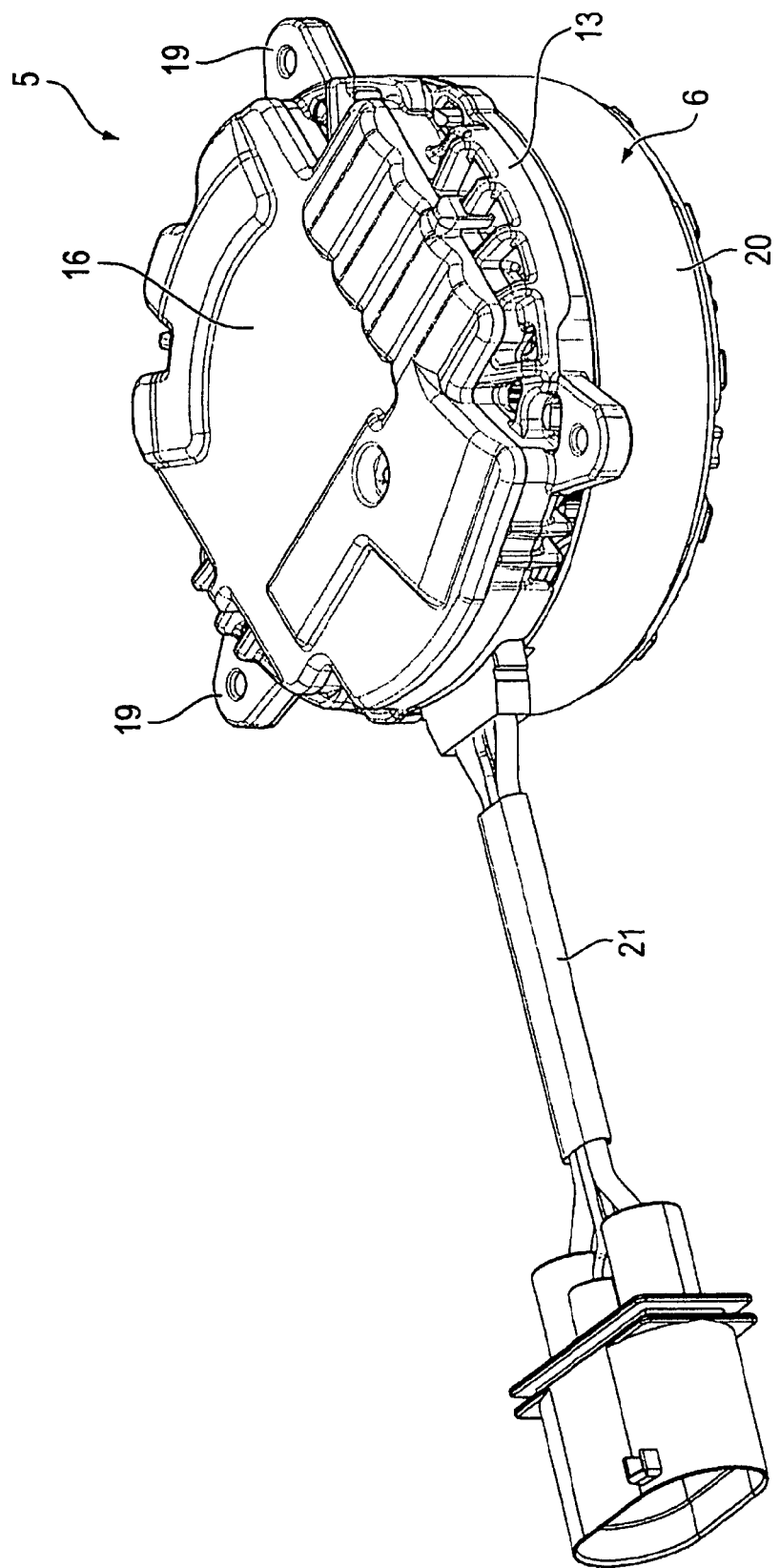
FIG. 2 is a perspective view looking at a connection side of the motor according to FIG. 1.

In the assembled state of the motor 5, which state is shown in FIG. 2, the stator 6 is fixedly mounted on a front of the motor support 13. The rotor 8 is inserted into the stator 6 which is encapsulated with a plastic casing 20, wherein the rotor 8 is flanked on both axial sides by in each case one of the two roller bearings 10 and 11. In this case, the roller bearings 10 and 11 are mounted, in a manner which is not illustrated in any detail, on an axle pin which, for its part, is fastened to the motor support 13.

Figure 3:
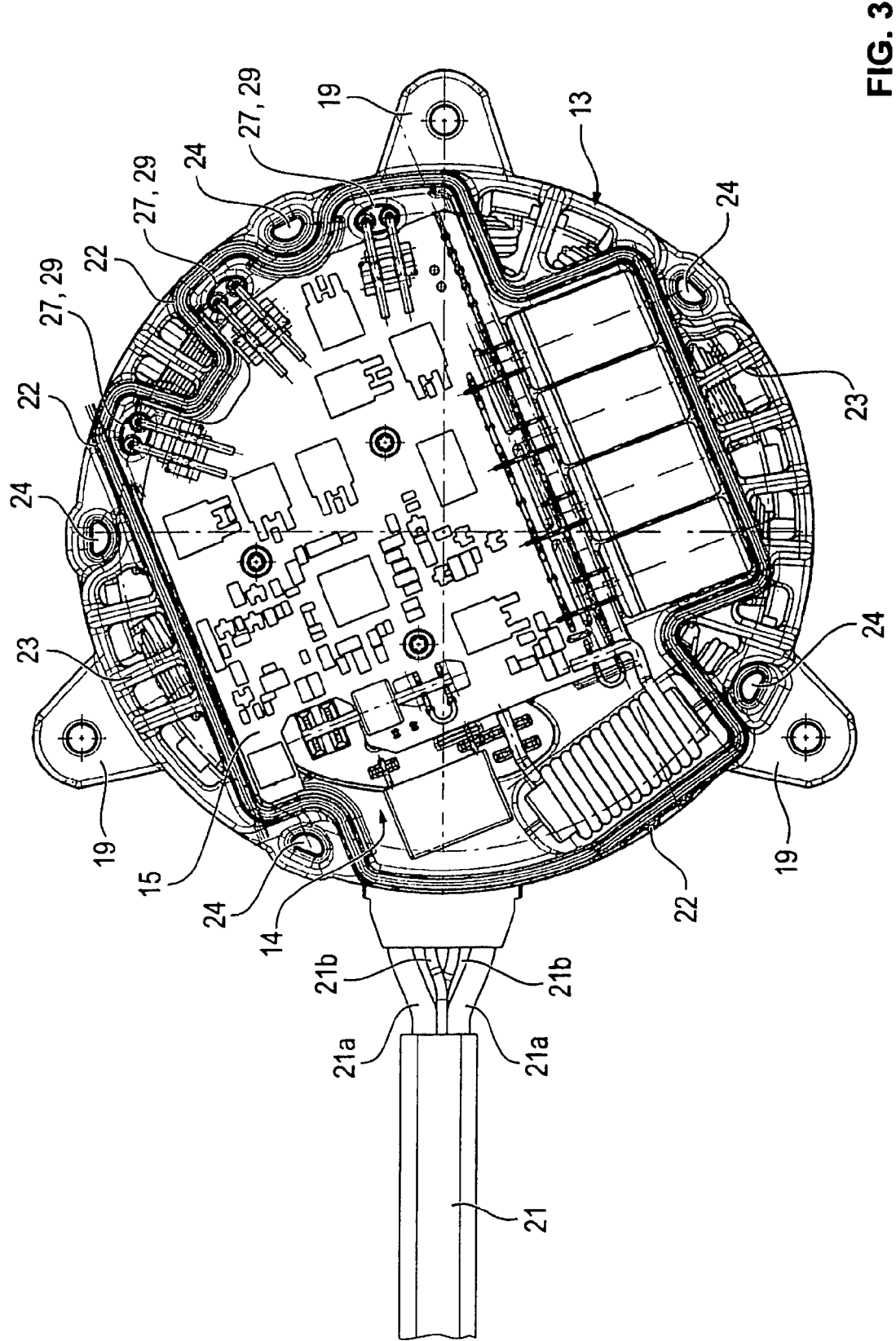
FIG. 3 is a plan view of the motor according to FIG. 1 with a cover of an electronics compartment (housing cover) removed.

FIG. 3 shows the motor 5 with the electronics compartment cover 16 removed and looking into the electronics compartment 14 with the converter electronics system 15 arranged therein. Supply lines (positive and negative or ground pole) and also sensor or data lines of a connection cable 21 are guided to and make contact with the converter electronics system. The electronics compartment 14 is surrounded by a peripheral, closed sealing or joining rim 22. Outside the electronics compartment 14, the motor support 13 has substantially radially running clamping ribs 23 for the electronics compartment cover 16. Fixing or pressing openings 24 are located in several positions which are distributed over the circumference of the motor support 13.

Figure 4:
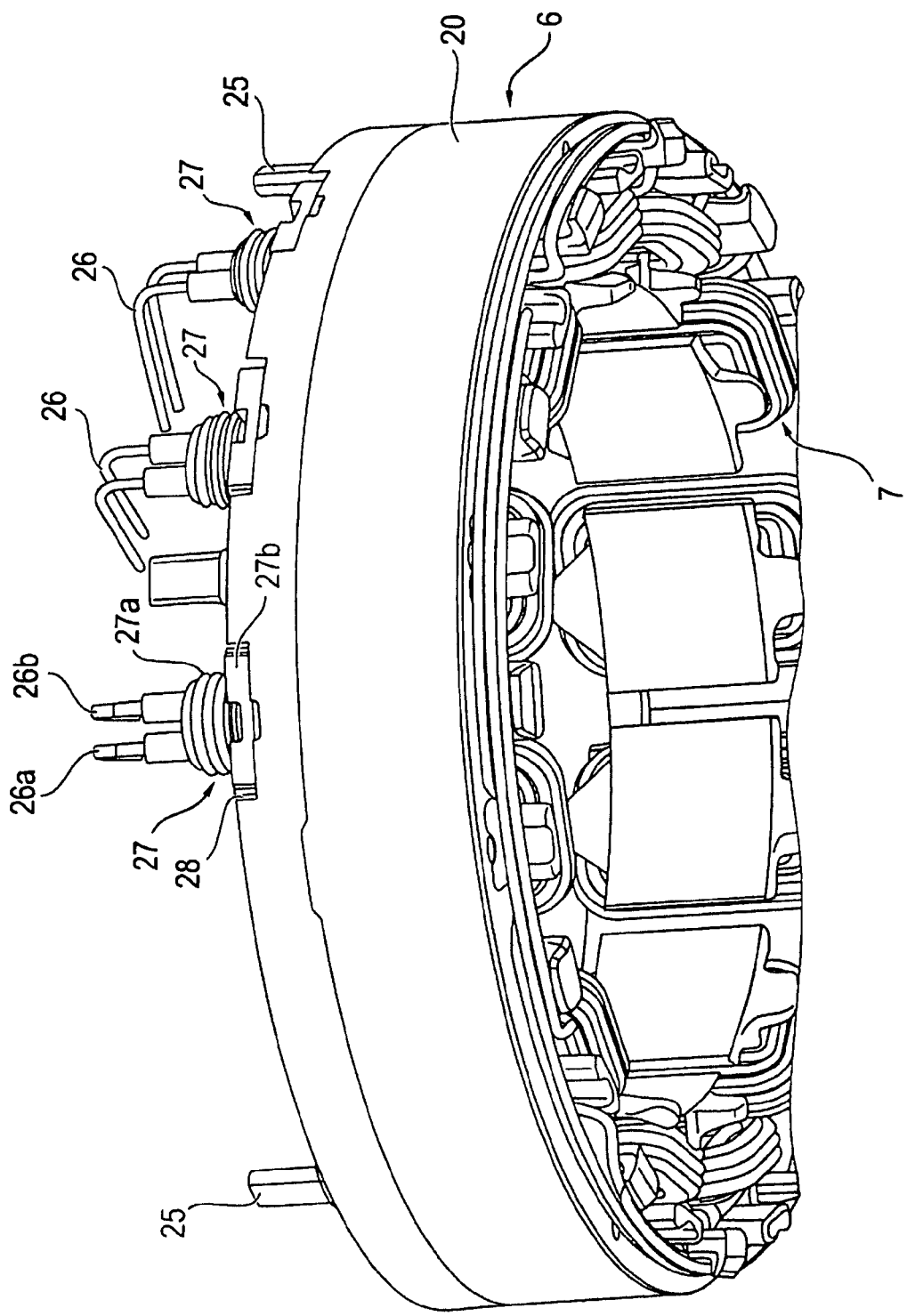
FIG. 4 is a perspective view of a stator which is encapsulated with a plastic casing (stator laminated core) having a rotating-field winding with winding ends thereof guided through sealing elements.
Figure 6:
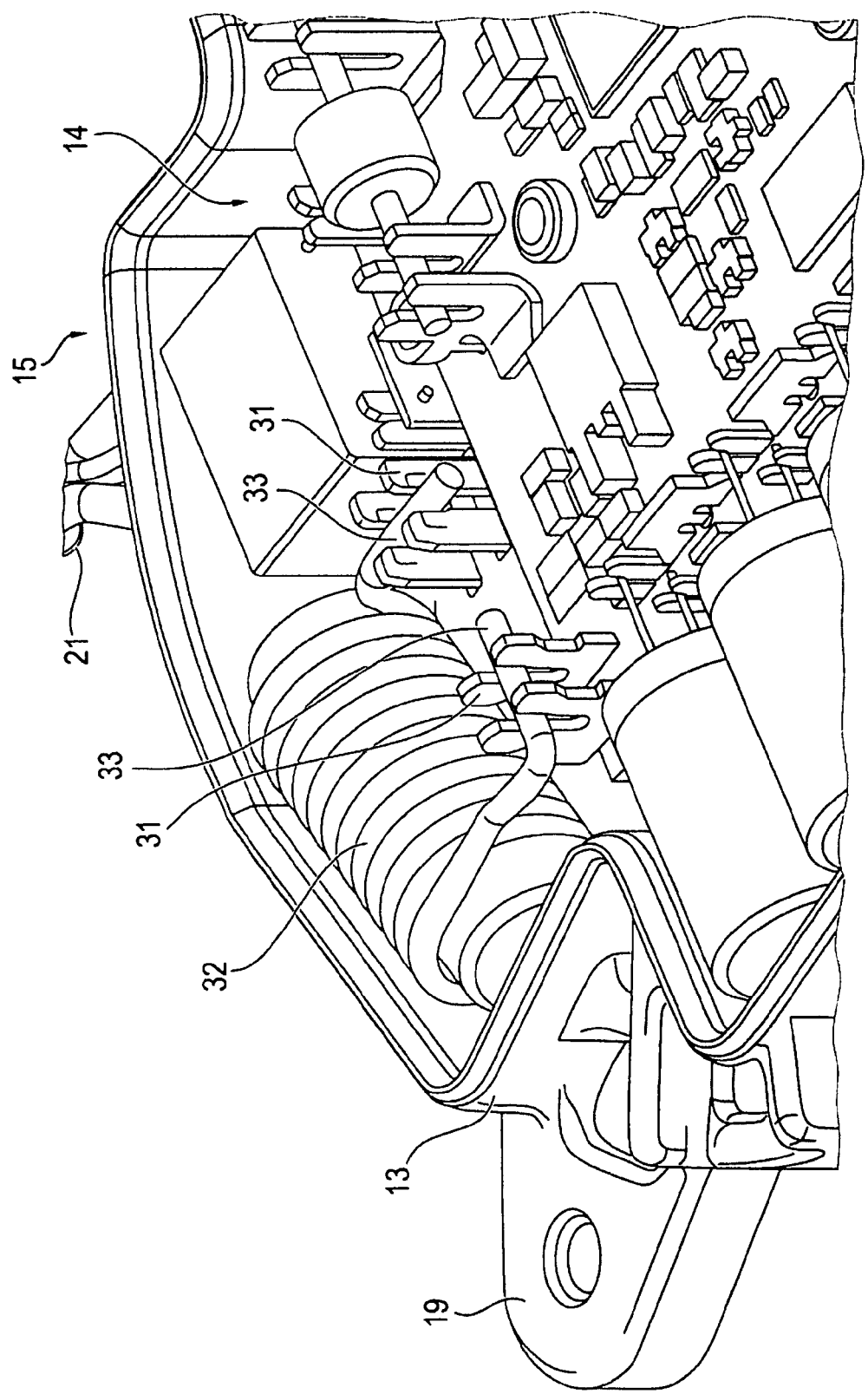
FIG. 6 is a perspective view according to FIG. 5 looking at an interference-suppression conductor with insulation-displacement contact-connected coil or contact ends.

FIG. 4 shows the stator 6, which is encapsulated by the plastic casing 20, and also the rotating-field winding 7 of the stator. Pressing studs 25 are integrally formed on a plastic casing 20, the pressing studs 25, in a joined state of the stator 6, passing through (FIG. 6) the pressing or fixing openings 24 of the motor support 13 and then being caulked, for example hot-deformed. Three pairs 26 of winding ends 26a, 26b, which are guided by sealing elements 27, are also shown.

The sealing elements 27 are preferably produced from a two-component plastic and have a comparatively soft seal component 27a, which is preferably formed in the manner of a labyrinth seal, and a comparatively hard supporting component 27b. By way of the hard supporting component 27b, the respective sealing element 27 sits in a receiving pocket 28 which is formed in the plastic casing 20 of the stator 6. By way of the soft seal component 27a, the sealing elements 27 sit in corresponding passage openings 29 in the motor support 13 in a sealing manner, wherein the pairs 26 of winding ends of the rotating-field winding 7 are accordingly guided into the electronics compartment 15, as is shown in FIGS. 3, 5, 8 and 11.

Figure 5:
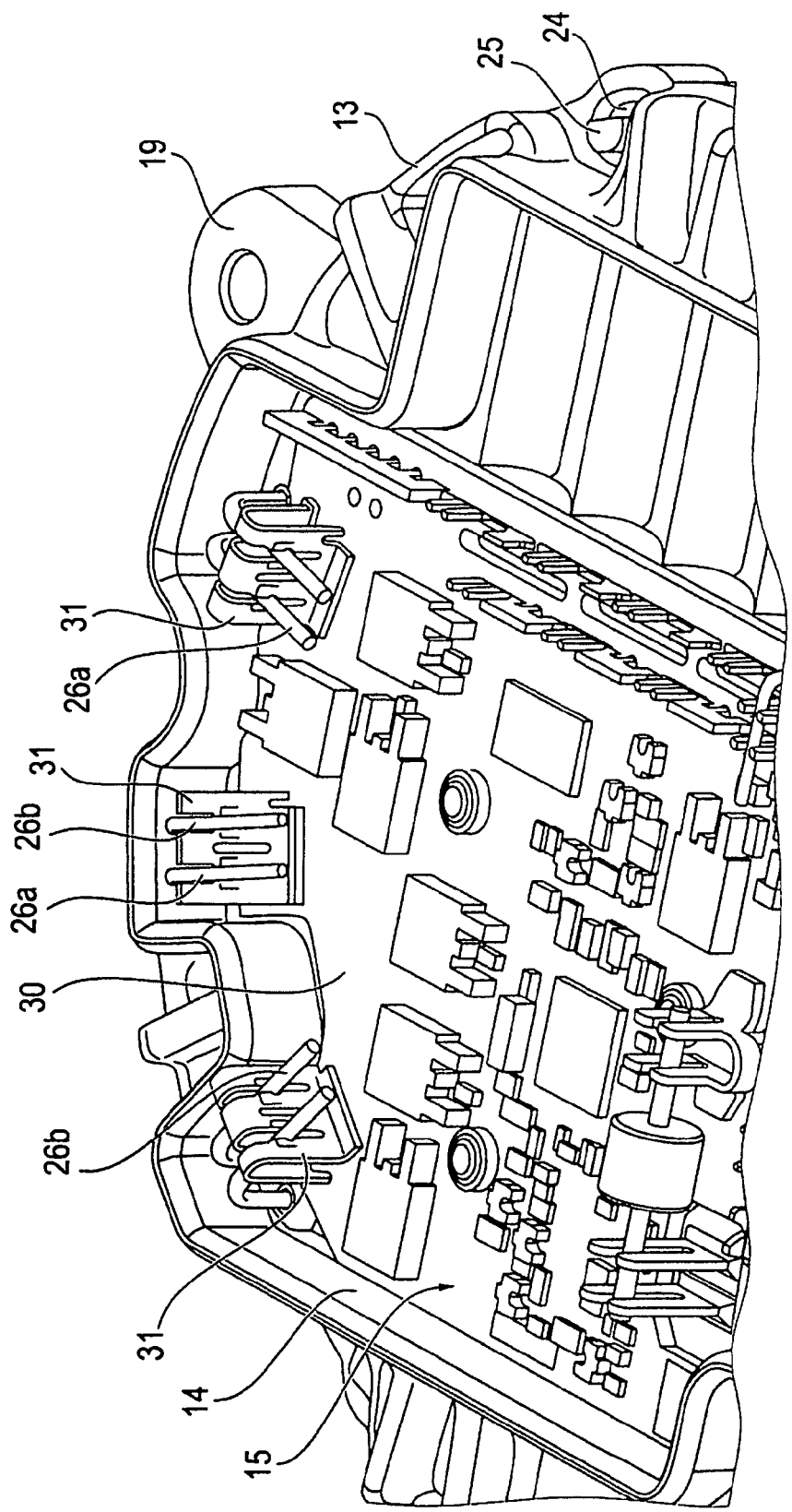
FIG. 5 is a perspective view of a detail of the converter electronics system looking at an insulation-displacement contact-connection of the winding ends of the rotating-field winding of a stator-side rotating-field winding.

FIG. 5 shows the converter electronics 15 within the electronics compartment 14 with insulation-displacement contacts 31, which are mounted on a printed circuit board 30, for making contact with the winding ends 26a, 26b of the rotating-field winding 7 or the coils 7a thereof. The insulation-displacement contacts 31 are, for example, soldered onto the printed circuit board 30 or mounted on the printed circuit board in some other way. The design of the insulation-displacement contacts 31 is described in greater detail in connection with FIGS. 12 and 13.

FIG. 6 once again shows the converter electronics system 15, which is arranged in the electronics compartment 14 of the motor support 13, looking at an interference-suppression inductor 32. Contact is likewise made with the contact connections or ends 33 of the interference-suppression inductor 32, which connection contacts or ends are also called coil ends in the text which follows, in insulation-displacement contacts 31, of which the geometry is again explained in greater detail with reference to FIGS. 12 and 13.

Figure 7:
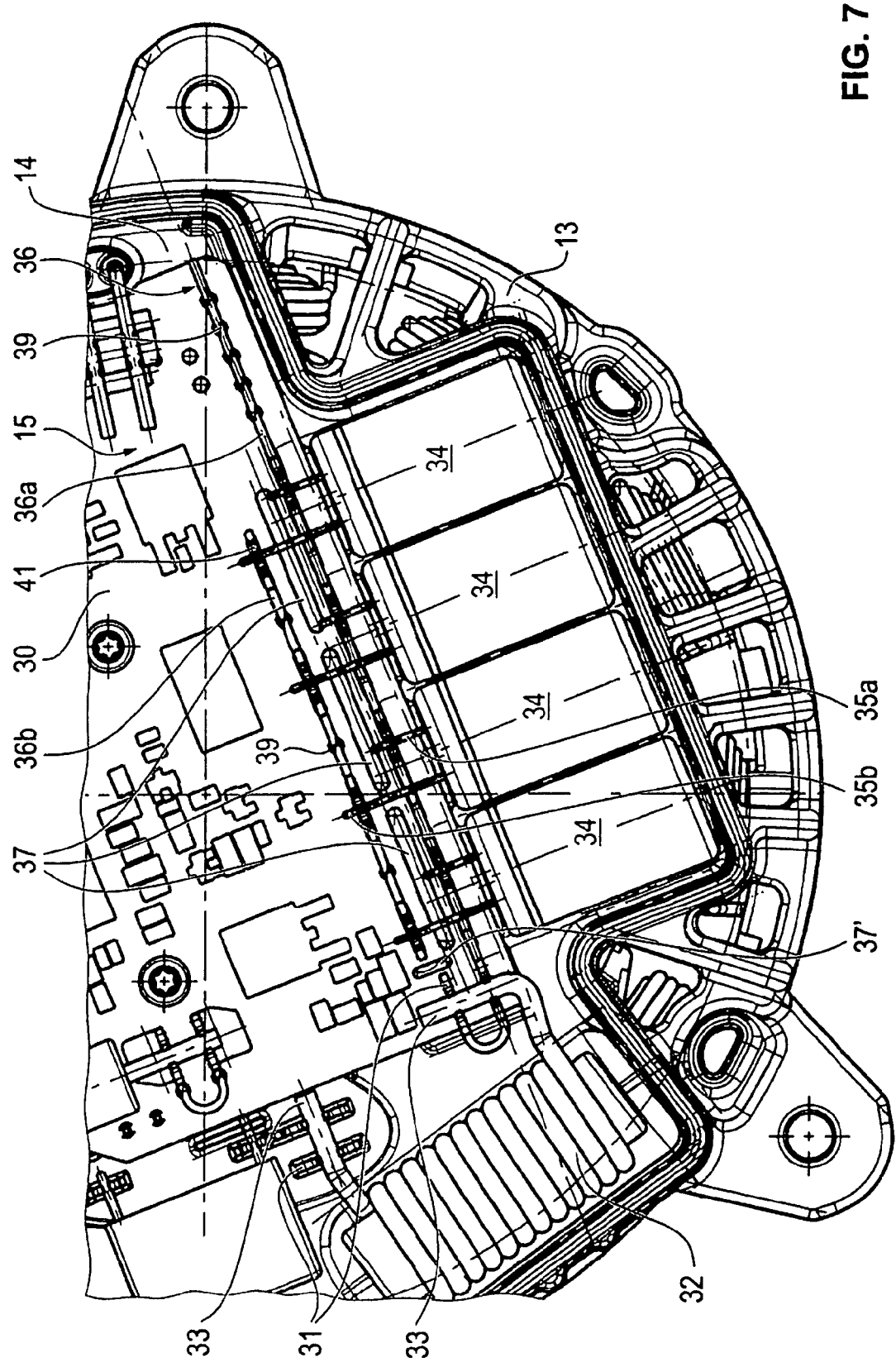
FIG. 7 is a plan view of a detail of the converter electronics system looking at a plurality of charging capacitors which are contact-connected by busbars.

FIG. 7 likewise shows the printed circuit board 30 of the converter electronics 15 and also charging capacitors 34 which are arranged next to one another within the electronics compartment 14 and have connections or connection contacts 35a, 35b. Contact is made with the connections or connection contacts in busbars 36a and, respectively, 36b in a clamping manner. The busbars 36a and 36b, which are arranged parallel in relation to one another, form a pair 36 of busbars. One of the busbars, in the present case the busbar 36a, is bent in the shape of a U at one bar end and there contains one of the insulation-displacement contacts 31 for the corresponding coil end 33 of the interference-suppression inductor 32.

Figure 11:
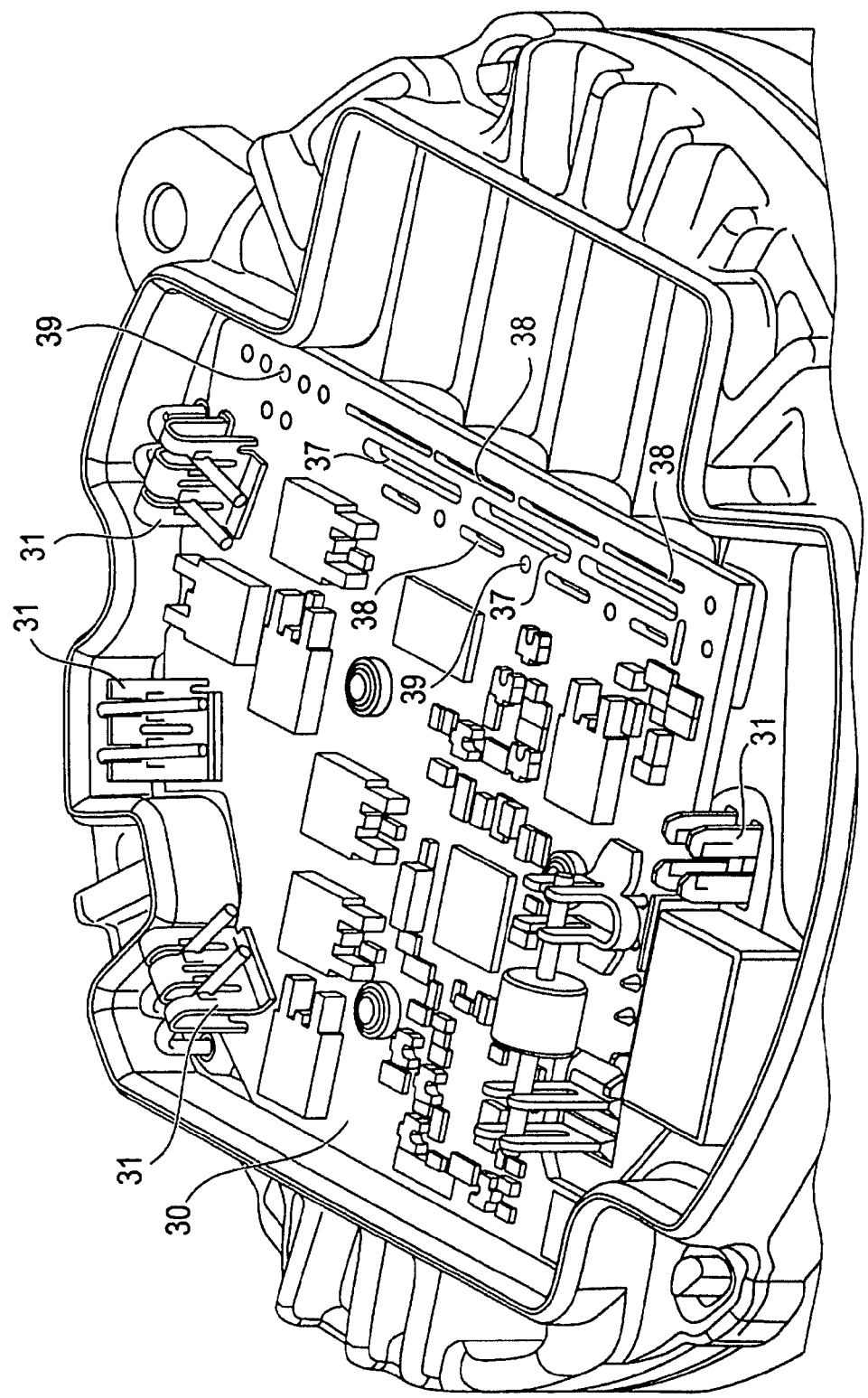
FIG. 11 is a perspective view according to FIG. 5 looking at an insertion slot and insertion whole pattern of the printed circuit board for the busbars.

As shown comparatively clearly in FIG. 11, slot-like recesses 37 in the printed circuit board 30 which run in the longitudinal direction of the bars are located between the two busbars 36a and 36b of the pair 36 of busbars which run at a distance from and parallel to one another. The recesses 37 serve to suppress creepage currents and to prevent crystallization. The busbars 36a, 36b are mounted and held on the printed circuit board 30 in insertion slots 38 and insertion openings or holes 39 which are made in the printed circuit board.

Figure 8:
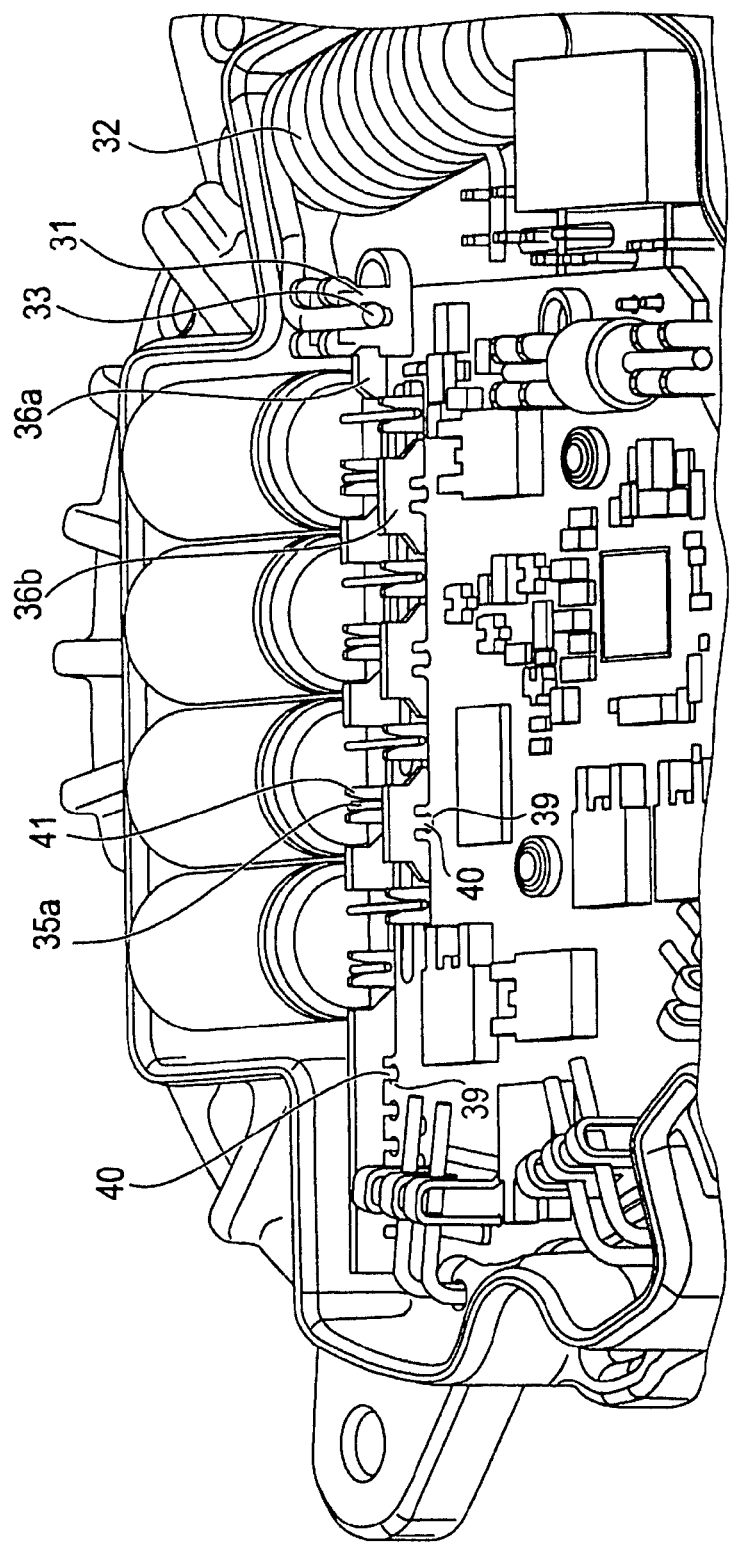
FIG. 8 is a perspective view of a clamping contact-connection of the charging capacitors by the busbars.
Figure 9:
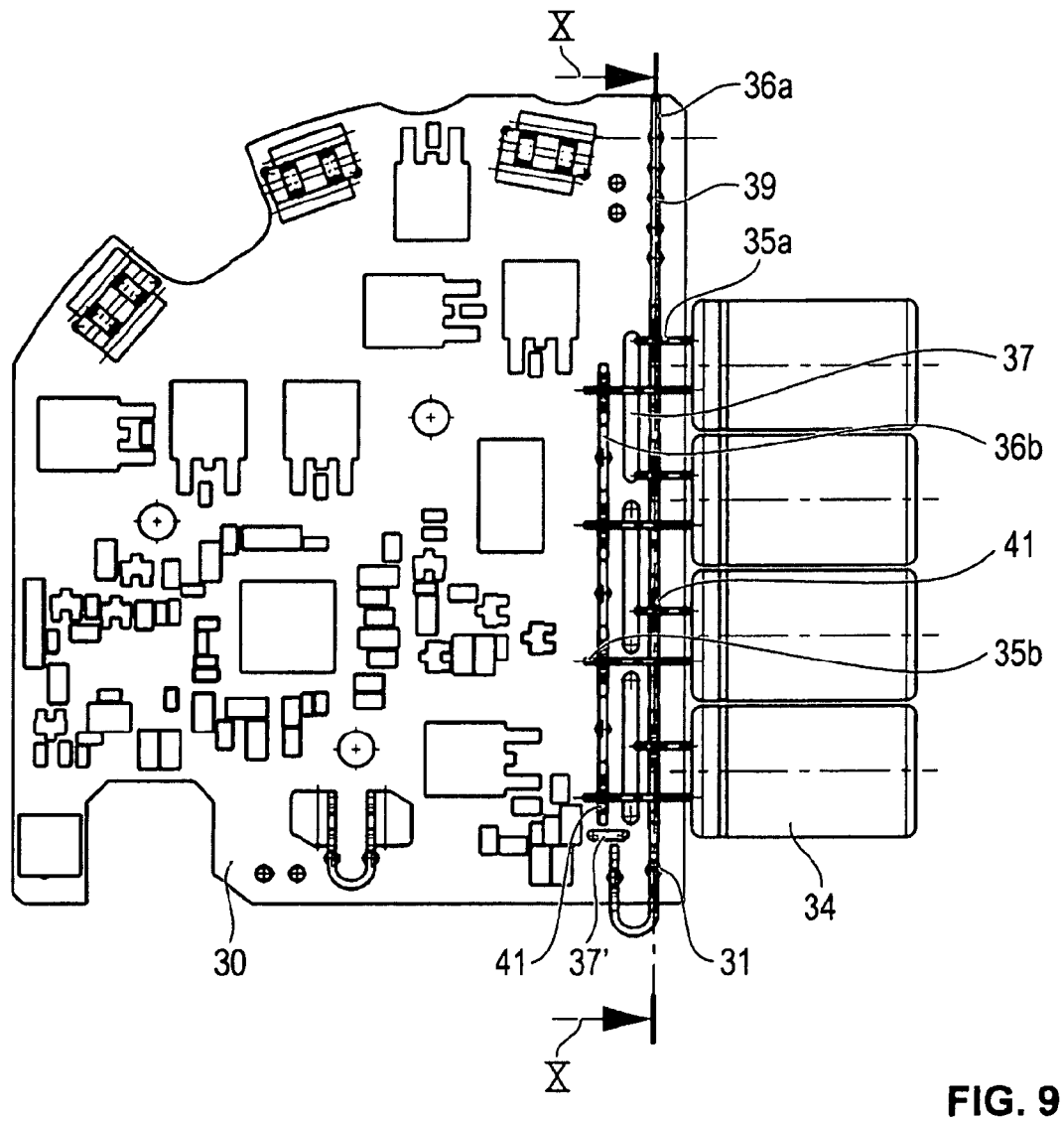
FIG. 9 is a plan view of the printed circuit board, which is fitted with structural elements, of the converter electronics system with the clamping contact-connected charging capacitors.
Figure 10:
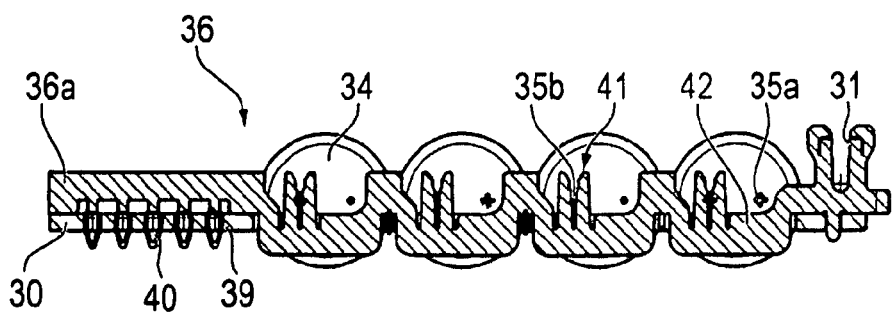
FIG. 10 is a sectional view taken along the line X-X shown in FIG. 9 looking at the charging capacitors and the connection contacts thereof.

As shown comparatively clearly in FIGS. 8 to 10, press-in pins 40, which are integrally formed on the busbars 36a and 36b, correspond to the insertion holes 39. The press-in pins are configured in the form of wedges or arrowheads and therefore allow the pair 36 of busbars to sit in the printed circuit board 30 in a reliable, in particular force-fitting, manner. The busbars 36a, 36b make contact with the capacitors 34 by clamping contacts 41 in which the connection contacts 35a and 35b of the capacitors 34 are contact-connected in a clamping manner.

As shown comparatively clearly in FIG. 10, a number of recesses 42 are made in the busbar 36a which faces the capacitors 34 and is therefore positioned closest to the capacitors. The connection contact 35a of the respective capacitor 34 with which contact is to be made by the opposite busbar 36b is guided by the recesses without contact, and therefore in a contact-free manner. The design of the pair 36 of busbars allows a particularly reliable and, in particular, space-saving arrangement of the contact elements 31, 41, which are formed by the busbars 36a and 36b, for the interference-suppression inductor or for the charging capacitors 34.

As shown comparatively clearly in FIGS. 7 and 9, a further recess 37' is made in the printed circuit board 30 between the short U-limb of the busbar 36a and the end of the busbar 36b which is parallel to it, in order to also prevent a creepage current and/or temperature-related crystallization at this point. This slot or this recess 37' runs transverse to the recesses 37 which are located between the busbars 36a, 36b.

Figures 12A, 12B, 12C:
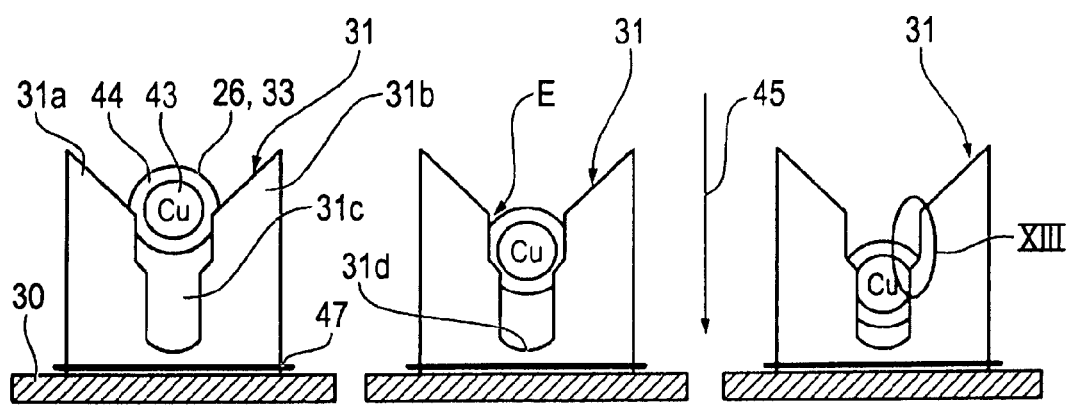
FIGS. 12A-12C are end views of an insulation-displacement contact according to the invention with a connection with which contact is to be made in different positions.
Figure 13:
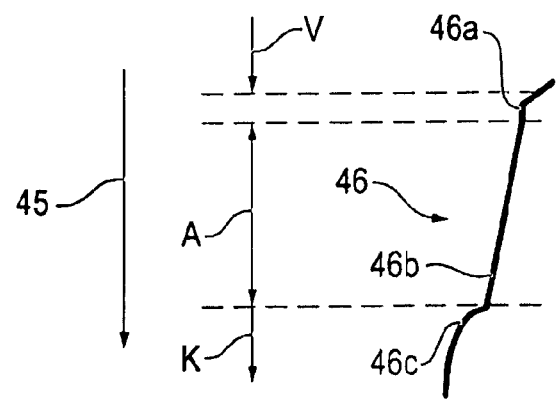
FIG. 13 is an illustration of detail XIII from FIG. 12C on an enlarged scale with an illustration of the insulation-displacement geometries of the insulation-displacement contact.

FIGS. 12 and 13 schematically show the geometry of the insulation-displacement contacts 31 for enamel-insulated connections (connection contacts) and solid wires as are present in the winding ends 26 of the rotating-field winding 7 and the coil ends 33 of the interference-suppression inductor 32 in the present case. Solid wires of this kind usually comprise a copper core or copper line 43 which is sheathed with enamel insulation 44.

The insulation-displacement contact 31 has an insulation-displacement gap 31*c* between its insulation-displacement limbs 31*a* and 31*b*. The insulation displacement gap extends in the insulation-displacement direction 45 starting from an insertion zone (insertion opening) E to the contact or clamping base 31*d*. The insulation-displacement edges 46 which flank the insulation-displacement gap 31*c* on both sides are configured in the insulation-displacement direction 45 in such a way that different zones with different functions are produced along the insulation-displacement gap 31*c*.

For example, a pre-cutting zone V adjoins the insertion zone E. The insulation-displacement edge 46 of the two insulation-displacement limbs 31*a*, 31*b* is configured with a corresponding cutting edge 46*a* in a sharp-edged manner within the pre-cutting zone V. The enamel insulation 44 of the respective contact 26, 33 is reliably cut within the pre-cutting zone V.

An abrasion zone A adjoins the pre-cutting zone V. The insulation-displacement edge 46 runs obliquely within the abrasion zone. Within the abrasion zone A, the insulation-displacement gap 31*c* increasingly tapers in the insulation-displacement direction 45 in the direction of the clamping base 31*d* between the corresponding abrasion edges 46*b* of the mutually opposite insulation-displacement edges 46 of the two limbs 31*a* and 31*b* of the insulation-displacement contact 31. As the contact 26, 33 slides along the oblique abrasion edge 46*b*, the enamel insulation 44 slowly abrades within the abrasion zone A, without insulation residues remaining at the contact point.

A clamping zone K adjoins the abrasion zone A in the insulation-displacement direction 45. In particular, a round edge 46*c* is formed on the insulation-displacement edge 46 at the point of entry from the abrasion zone A into the clamping zone K. The round edge or the radius thereof causes a slow increase in force when the contact 26, 33 is pressed into the clamping zone K of the insulation-displacement gap 31*c*. The maximum press-in forces are reduced as a result. This in turn leads to a corresponding reduction in the force which acts on a connection point 47 between the insulation-displacement contact 31 and the printed circuit board 30. The connection 47, which is configured as a solder point, is correspondingly subjected to low mechanical loading as a result.

The invention is not restricted to the above-described exemplary embodiments. Rather, other variants of the invention can also be derived from the above by a person skilled in the art without departing from the subject matter of the invention. In particular, all of the individual features described in connection with the various exemplary embodiments can furthermore also be combined in any other way, without departing from the subject matter of the invention.

For example, the clamping contact-connection of the charging capacitors 34 by the pair 36 of busbars and also the connection of the charging capacitors to the printed circuit board 30 and the configuration of the charging capacitors with corresponding insertion openings 38, 39 (insertion slots or insertion holes) and also preferably slot-like recesses which are arranged between the insertion openings for preventing creepage currents and/or temperature-related crystallization or crystallization phenomena themselves are inventive on their own and therefore constitute an independent invention.

The electric motor 5 in this respect, in particular a radiator fan motor for a motor vehicle, contains a (wound) stator 6 and a rotor 8, which is mounted such that it can rotate in relation to the stator, and also a converter electronics system 15 having a printed circuit board 30 and a pair 36 of busbars with clamping contacts 41 for making clamping contact with a number of charging or storage capacitors 34.

In an advantageous refinement of the electric motor 5, the printed circuit board 30 is provided with slot-and/or hole-like insertion openings 38, 39 for receiving corresponding insertion points or insertion pins 40 of the pair 36 of busbars. Recesses 37 which are preferably additionally made in the printed circuit board 30 and which are located between the busbars 36*a* and 36*b* of the pair 36 of busbars serve to prevent creepage currents and/or temperature-related crystallization phenomena. Recesses 42, which are expediently provided, in one of the busbars 36*a* serve to guide connections or connection contacts 35*b* of the capacitors 34 with which clamping contact has been made by the other busbar 36*b*.

The insulation-displacement concept for the interference-suppression inductor 32 also constitutes an independent invention. The electric motor 5 in this respect, in particular in the form of a radiator fan motor for a motor vehicle, contains a rotor 8, which is mounted such that it can rotate in relation to a stator 6, and a converter electronics system 15 having an interference-suppression inductor 32 with which contact can be made by insulation-displacement contacts 31.

The insulation-displacement concept for the winding ends 26*a*, 26*b* of the stator-side rotating-field winding 7 likewise constitutes an independent invention.

The electric motor 5 in this respect, in particular in the form of a radiator fan motor for a motor vehicle, contains the stator 6 which is fitted with the rotating-field winding 7, and the, preferably permanent-magnet, rotor 8 which is mounted such that it can rotate in relation to the stator, and also the converter electronics system 15 having insulation-displacement contacts 31 for making contact with the winding ends 26*a*, 26*b* of the rotating-field winding 7. In an advantageous refinement of this electric motor 5, the converter electronics system 15 has a printed circuit board 30 on which the insulation-displacement contacts 31 are mounted, preferably by solder connections 47.

The invention claimed is:

1. A brushless electric motor, comprising:
   a stator having a rotating-field winding with enamel-insulated winding ends;
   a permanent-magnet rotor mounted such that said permanent-magnet rotor can rotate in relation to said stator; and
   a converter electronics system having:
   at least one component having insulation-free connection contacts or enamel-insulated connection contacts, said at least one component having at least one charging capacitor having said insulation-free connection contacts;
   a pair of busbars having a number of clamping contacts corresponding to a number of said insulation-free connection contacts of said charging capacitor, said pair of busbars further having corresponding press-in pins;
   a printed circuit board having a number of insertion slots formed therein and/or insertion holes formed therein into which said pair of busbars are inserted by way of said corresponding press-in pins, said printed circuit board further having a number of slot-shaped recesses formed therein which run parallel to said busbars, said slot-shaped recesses being formed between said insertion slots or said insertion holes which are associated with said two busbars of said pair of busbars; and a number of contact elements for said insulation-free connection contacts or said enamel-insulated connection contacts of said at least one component and/or for said enamel-insulated winding ends of said rotating-field winding, said contact elements mounted on said printed circuit board and being in a form of clamping contacts or insulation-displacement contacts.

2. The electric motor according to claim 1, wherein:
said number of contact elements are insulation-displacement contacts; and
said at least one component includes an interference-suppression inductor with said enamel-insulated connection contacts with which clamping contact is made in said insulation-displacement contacts.

3. The electric motor according to claim 1, wherein:
said charging capacitor is one of a plurality of charging capacitors;
one of said two busbars of said pair of busbars has a number of recesses formed therein and corresponding to a number of said charging capacitors, said insulation-free connection contacts of said charging capacitors, with which connection contact clamping contact is made by said other busbar, being guided through said recesses without making contact with one of said two busbars.

4. The electric motor according to claim 1, wherein said contact elements are insulation-displacement contacts having a contact base and two insulation-displacement limbs defining an insulation-displacement gap between said two insulation-displacement limbs, said insulation-displacement gap extends in an insulation-displacement direction from an insertion zone to said contact base and said insulation-displacement limbs each having a pre-cutting zone which adjoins the insertion zone and has a, sharp-edged, cutting edge.

5. The electric motor according to claim 4, wherein said contact elements each having an obliquely running, abrasion zone with an obliquely running, abrasion edge for said enamel-insulation connection contacts and adjoins said pre-cutting zone of said insulation-displacement gap in the insulation-displacement direction.

6. The electric motor according to claim 4, wherein said insulation-displacement gap has a rounded, clamping zone, which expediently adjoins the abrasion zone and has a rounded edge, for slowly increasing a clamping force in the insulation-displacement direction.

7. The electric motor according to claim 1, wherein the electric motor is a radiator fan motor of a motor vehicle.

\* \* \* \* \*